(12) United States Patent
Papa et al.

(10) Patent No.: US 12,577,924 B1
(45) Date of Patent: Mar. 17, 2026

(54) TAILCONE AND CONDUIT VENTILATION SYSTEM WITH VARIABLE INTERNAL FLOW DISTRIBUTION

(71) Applicant: RTX Corporation, Farmington, CT (US)

(72) Inventors: Federico Papa, Port Saint Lucie, FL (US); Cameron Allan Davis, Windsor, CT (US); Dmitriy Sidelkovskiy, Ellington, CT (US); Brian Lund, Moodus, CT (US); Stephen Okwilagwe, Peachtree Corners, GA (US); Samuel Reissmann, Brooklyn, NY (US); Keith Dahl, Schofield, WI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/987,005

(22) Filed: Dec. 19, 2024

(51) Int. Cl.
*F02K 1/82* (2006.01)
*B64D 29/00* (2006.01)
*F01D 25/14* (2006.01)

(52) U.S. Cl.
CPC .............. *F02K 1/822* (2013.01); *B64D 29/00* (2013.01); *F01D 25/14* (2013.01)

(58) Field of Classification Search
CPC ........ B64D 27/12; B64D 27/14; B64D 27/18; B64D 27/20; B64D 29/00; B64D 29/02; B64D 29/04; F01D 25/14; F02C 7/32; F02K 1/04; F02K 1/822
See application file for complete search history.

(56) References Cited

U.S. PATENT DOCUMENTS

| | | | |
|---|---|---|---|
| 7,032,387 B2 | 4/2006 | Germain et al. | |
| 7,805,925 B2 | 10/2010 | Durocher et al. | |
| 8,640,436 B2 | 2/2014 | Thies | |
| 8,650,854 B2 | 2/2014 | Migliaro, Jr. et al. | |
| 2022/0082052 A1* | 3/2022 | Muldoon | F02K 1/04 |

* cited by examiner

*Primary Examiner* — Scott J Walthour
(74) *Attorney, Agent, or Firm* — Bachman & LaPointe, P.C.

(57) ABSTRACT

A tail cone ventilation system including a tail cone case defining a tail cone interior and a tail cone exterior, the tail cone having a forward portion and an aft portion separated axially along a tail cone axis; an air inlet fluidly coupled with the tail cone interior through ducting, the air inlet located externally from the tail cone interior; a conduit attached to the tail cone case at the tail cone exterior and to a pylon at an opposite end, the conduit comprising a cable chase having cable, the cable being in operative communication with at least one electronic component within the tail cone interior; a cooling supply fluidly coupled between the air inlet and a pylon exhaust, the cooling supply configured to cool the cable within the cable chase; and a fan fluidly coupled with the cooling supply.

17 Claims, 2 Drawing Sheets

TAILCONE AND CONDUIT VENTILATION SYSTEM WITH VARIABLE INTERNAL FLOW DISTRIBUTION

BACKGROUND

The present disclosure is directed to the improved ventilation of electronics located in a tail cone zone.

Future hybrid engine programs might require installation of electronics in the tail cone zone. The electronics can include generators, electrical motors, power feed cables, processor electronics, and the like. These electronics may have a low thermal capability and produce excess thermal energy that can develop temperatures which can damage or degrade the electronics. This new location for components with low thermal capability requires a ventilation system capable of maintaining temperatures within predetermined operational limits.

SUMMARY

In accordance with the present disclosure, there is provided a tail cone ventilation system comprising a tail cone case defining a tail cone interior and a tail cone exterior, the tail cone having a forward portion and an aft portion separated axially along a tail cone axis; an air inlet fluidly coupled with the tail cone interior through ducting, the air inlet located externally from the tail cone interior; a conduit attached to the tail cone case at the tail cone exterior and to a pylon at an opposite end, the conduit comprising a cable chase having cable, the cable being in operative communication with at least one electronic component within the tail cone interior; a cooling supply fluidly coupled between the air inlet and a pylon exhaust, the cooling supply configured to cool the cable within the cable chase; and a fan fluidly coupled with the cooling supply.

A further embodiment of any of the foregoing embodiments may additionally and/or alternatively include the air inlet comprises an air scoop design configured to receive air flowing past an outer surface of at least one of a gas turbine engine or a vehicle.

A further embodiment of any of the foregoing embodiments may additionally and/or alternatively include the cable chase is isolated from the tail cone interior by at least one of a firewall or a fire damper located within the conduit.

A further embodiment of any of the foregoing embodiments may additionally and/or alternatively include the tail cone ventilation system further comprising a tail cone discharge located proximate the tail cone aft portion, the tail cone discharge being fluidly coupled with the air inlet.

A further embodiment of any of the foregoing embodiments may additionally and/or alternatively include the fan is located within an internal flow passage extending from the tail cone interior to the pylon exhaust at a pylon trailing edge.

A further embodiment of any of the foregoing embodiments may additionally and/or alternatively include the fan comprises a variable speed electric fan configured to provide a range of cooling air flow rates.

A further embodiment of any of the foregoing embodiments may additionally and/or alternatively include the fan operative responsive to at least one of an initiation of an engine shutdown cycle or an indication that a vehicle associated with the tail cone ventilation system is stationary.

In accordance with the present disclosure, there is provided a tail cone ventilation system comprising a gas turbine engine aft portion; a tail cone case attached to the gas turbine aft portion; the tail cone case defining a tail cone interior and a tail cone exterior, the tail cone having a forward portion and an aft portion separated axially along a tail cone axis; an air inlet fluidly coupled with the tail cone interior through ducting, the air inlet located externally from the tail cone interior; a conduit attached to the tail cone case at the tail cone exterior and to a pylon at an opposite end, the conduit comprising a cable chase having cable, the cable being in operative communication with at least one electronic component within the tail cone interior; a cooling supply fluidly coupled between the air inlet and a pylon exhaust, the cooling supply configured to cool the cable within the cable chase; and a fan fluidly coupled with the cooling supply.

A further embodiment of any of the foregoing embodiments may additionally and/or alternatively include the air inlet comprises an air scoop design configured to receive air flowing past an outer surface of at least one of the gas turbine engine or a vehicle.

A further embodiment of any of the foregoing embodiments may additionally and/or alternatively include the tail cone ventilation system further comprising a tail cone discharge located proximate the tail cone aft portion, the tail cone discharge being fluidly coupled with the air inlet.

A further embodiment of any of the foregoing embodiments may additionally and/or alternatively include the fan is located within an internal flow passage extending from the tail cone interior to the pylon exhaust at a pylon trailing edge.

A further embodiment of any of the foregoing embodiments may additionally and/or alternatively include the fan comprises a variable speed electric fan configured to provide a range of cooling air flow rates.

A further embodiment of any of the foregoing embodiments may additionally and/or alternatively include the fan operative responsive to at least one of an initiation of an engine shutdown cycle or an indication that a vehicle associated with the tail cone ventilation system is stationary.

In accordance with the present disclosure, there is provided a process for cooling a tail cone interior comprising attaching a tail cone case to a gas turbine engine aft portion, the tail cone case defining a tail cone interior and a tail cone exterior, the tail cone having a forward portion and an aft portion separated axially along a tail cone axis; fluidly coupling an air inlet with the tail cone interior through ducting; locating the air inlet externally from the tail cone interior; attaching a conduit to the tail cone case at the tail cone exterior and to a pylon at an opposite end, the conduit comprising a cable chase having cable; coupling the cable in operative communication with at least one electronic component within the tail cone interior; fluidly coupling a cooling supply between the air inlet and a pylon exhaust; configuring the cooling supply to cool the cable within the cable chase; and fluidly coupling a fan with the cooling supply.

A further embodiment of any of the foregoing embodiments may additionally and/or alternatively include the air inlet comprises an air scoop design configured to receive air flowing past an outer surface of at least one of the gas turbine engine or a vehicle.

A further embodiment of any of the foregoing embodiments may additionally and/or alternatively include the process further comprising locating a tail cone discharge proximate the tail cone aft portion; and fluidly coupling the tail cone discharge with the air inlet.

A further embodiment of any of the foregoing embodiments may additionally and/or alternatively include the process further comprising locating the fan within an internal flow passage; and extending the internal flow passage from the tail cone interior to the pylon exhaust at a pylon trailing edge.

A further embodiment of any of the foregoing embodiments may additionally and/or alternatively include the process further comprising configuring the fan as a variable speed electric fan comprising a range of cooling air flow rates.

A further embodiment of any of the foregoing embodiments may additionally and/or alternatively include the process further comprising configuring the fan operative responsive to at least one of an initiation of an engine shutdown cycle or an indication that a vehicle associated with the tail cone ventilation system is stationary.

A further embodiment of any of the foregoing embodiments may additionally and/or alternatively include the process further comprising isolating the cable chase from the tail cone interior employing at least one of a firewall or a fire damper located within the conduit.

Other details of the tail cone ventilation system are set forth in the following detailed description and the accompanying drawings wherein like reference numerals depict like elements.

DETAILED DESCRIPTION

Figure 1:
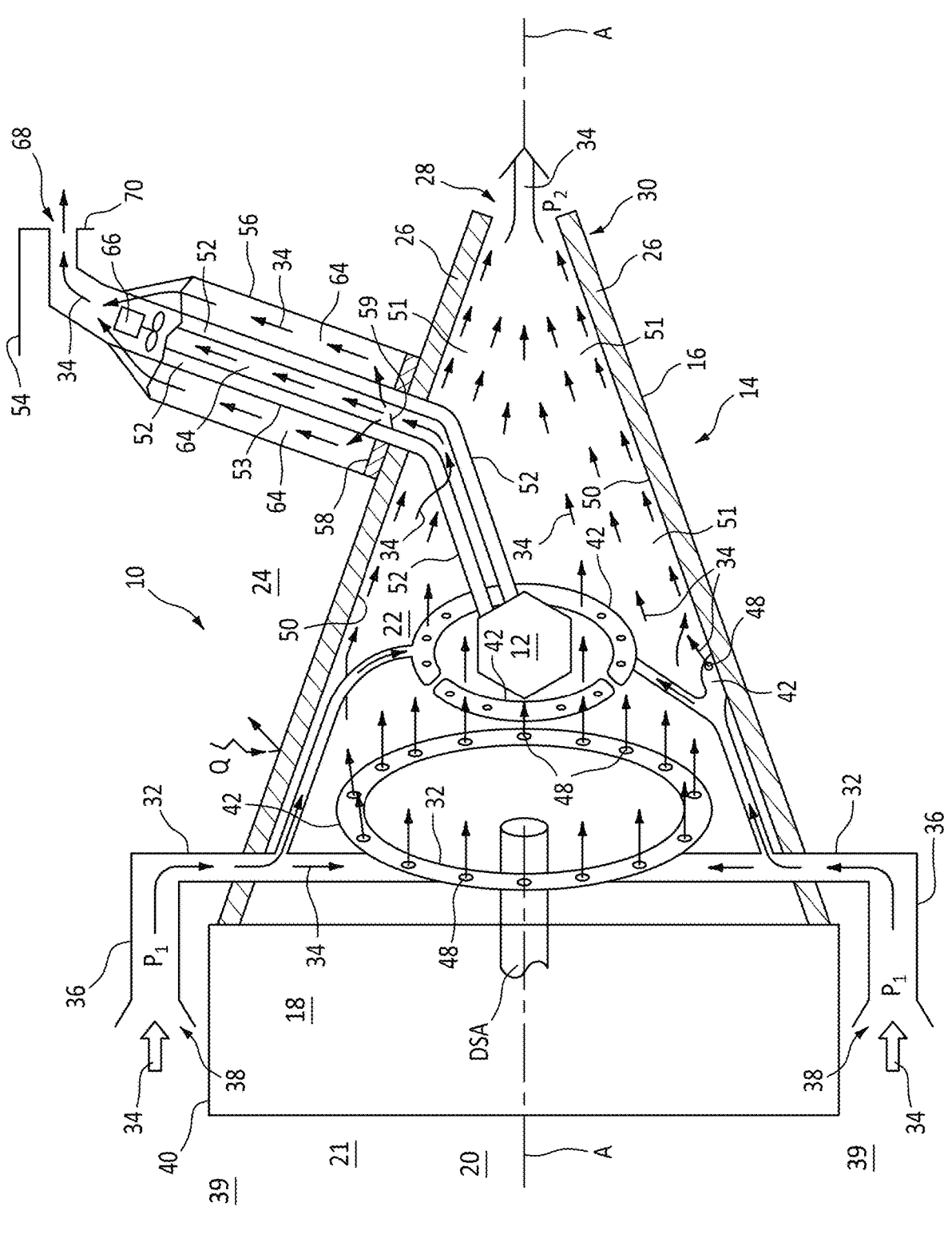
FIG. 1 is a partial cross-section schematic representation of an exemplary ventilation system for the tail cone zone.
Figure 2:
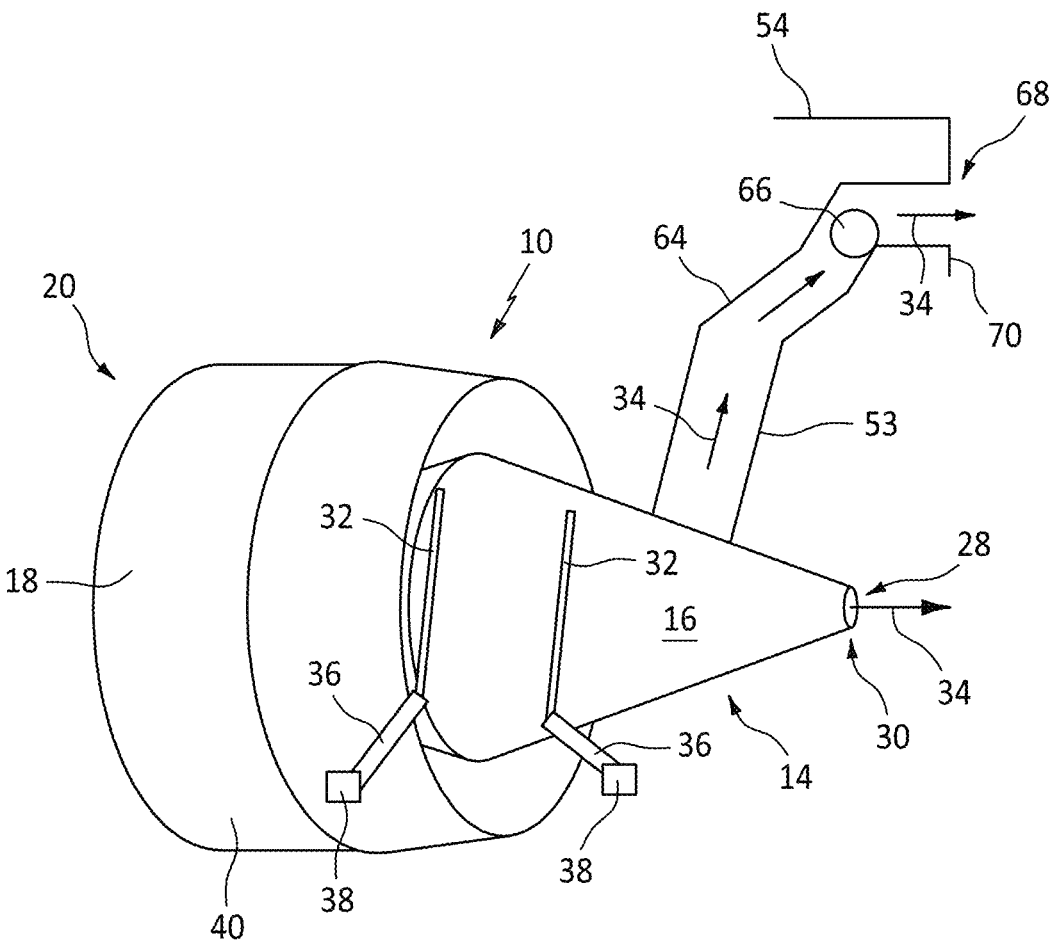
FIG. 2 is an external isometric schematic representation of an exemplary ventilation system for the tail cone zone.

Referring now to FIG. 1 and FIG. 2, there is illustrated an exemplary ventilation system 10. The ventilation system 10 is configured to cool electronic components 12 located within the tail cone 14. The electronic components 12 can include a generator, electrical motors, power feeder cables, processor electronics, and the like.

The tail cone 14 includes a tail cone case 16 coupled to an aft portion 18 of a gas turbine engine 20. The tail cone case 16 defines a tail cone interior 22 and a tail cone exterior 24. The tail cone case 16 includes insulation 26 covering the tail cone case 16 between the tail cone interior 22 and the tail cone exterior 24. The insulation 26 inhibits the transfer of thermal energy Q across the tail cone case 16. The insulation 26 helps to maintain the tail cone interior 22 at predetermined temperatures. The tail cone case 16 includes a tail cone discharge 28 located proximate a tail cone aft portion 30.

The ventilation system 10 includes ducting 32 configured to transport cooling air 34 from the tail cone exterior 24 through the tail cone case 16 and into the tail cone interior 22. The ducting 32 is shown with two supply branches 36, although in exemplary embodiments a single supply or multiple supply branches are contemplated. The supply branches 36 capture cooling air 34 at an air inlet 38 located at the tail cone exterior 24. The air pressure P1 at the air inlet 38 is greater than the air pressure P2 at the tail cone discharge 28. Thus, a positive ventilation rate can be maintained throughout the tail cone interior 22. The air inlet 38 can be configured as an air scoop design that is configured to receive air flowing past an outer surface 40 of the gas turbine engine 20 or vehicle 21 on which the gas turbine engine 20 operates (e.g., is mounted or coupled to). The air scoop design can be shaped with a bell-mouth and lower profile to meet the requirements of an external shape on the outer surface 40 of the vehicle or gas turbine engine 20. The air inlet 38 can be located on lower quadrants of a fan duct 39 of the gas turbine engine 20 or on an inner fixed structure of the vehicle 21.

The ventilation system 10 includes a distribution manifold 42 located within the tail cone interior 22 proximate a forward portion 44 of the tail cone 14. The forward portion 44 of the tail cone 14 is opposite the aft portion 30. The distribution manifold 42 receives cooling air 34 from the air inlet 38 through the ducting 32 and distributes the cooling air 34 into the tail cone interior 22 in order to cool the electronics 12 within the tail cone interior 22. The cooling air 34 flows through the tail cone interior 22 from the forward portion 44 aft toward the aft portion 30. The cooling air 34 flows through the tail cone discharge 28 to exit the tail cone interior 22. The cooling air 34 is at a temperature range which provides a cooling sink to remove thermal energy from the electronic components 12.

The distribution manifold 42 may include a circular torus located concentric around a tail cone axis A. The tail cone axis A can be aligned with a drive shaft axis DSA for a generator within the tail cone interior 22. The torus is configured to match the circular shape of the tail cone 14 and maximize the distribution of the cooling air 34 inside the tail cone interior 22 across the electronic components 12 and the tail cone case 16. In alternative embodiments, the distribution manifold 42 can be shaped, such as a cooling halo, to uniformly distribute the cooling air 34 throughout the tail cone interior 22 for cooling the electronic components 12 as well as the tail cone case 16. As illustrated in FIG. 1, the distribution manifold 42 can be formed in multiple parts, such as more than one torus. The distribution manifolds 42 can be made of varying circumferences, located at various distances from the tail cone forward portion along the axis A. Additionally, in some embodiments, such as that illustrated in FIG. 1, the distribution manifold 42 can be constructed as two semi-circles, each being fed by a separate supply branch 36. The distribution manifold 42 can be formed integral with the tail cone case 16.

The distribution manifold 42 can include nozzles 48 that discharge the cooling air 34 into the tail cone interior 22. The nozzles 48 can be configured to direct the cooling air 34 to particular electronic components 12 located within the tail cone interior 22. The nozzles 48 can be configured to direct the cooling air 34 along an inner surface 50 of the tail cone case 16 forming a cooling film layer 51. The cooling film layer 51 of cooling air 34 flowing along the inner surface 50 can inhibit the transfer of thermal energy Q into the tail cone interior 22 from the tail cone exterior 24.

The electronic components 12 require cable(s) 52 to supply/distribute electrical power and/or control signals with the gas turbine engine 20 or vehicle 21. The cables 52 can be fed to the tail cone interior 22 from a conduit 53. A cable chase 56 can be formed outside the conduit 53. The cable chase 56 can support the cable 52 within the conduit 53. The cable chase 56 can be isolated from the tail cone interior 22 by use of a firewall 58 and fire damper 59. The firewall 58 and fire damper 59 prevents fire penetration from the cable chase 56 to the tail cone interior 22. The cable chase 56 can be cooled from the tail cone interior 22 with the cooling air 34 provided to the conduit 53. The cooling air 34 is fed to the pylon 54. The air scoops 38 can be fluidly coupled to the cable chase 56 and conduit 53. The air scoops 38 can direct cooling air 34 to the cable chase 56 through internal flow passages 64.

A fan 66 can be fluidly coupled to the tail cone interior 22 via the conduit 53. The fan 66 can be a variable speed electric fan configured to provide a range of cooling air 34 flow rates, such as by pulling cooling air 34 from the tail cone interior 22. Different speeds for electric fan 66 can be employed to change the ventilation flow distribution between the conduit 53 and aft section 30 of the tail cone 14. Internal flow passages 64 direct the cooling air 34 out of the cable chase 56 to cool the cable 52 and pass the cooling air 34 out through the pylon 54. The cooling air 34 can be discharged out of a pylon exhaust 68. The pylon exhaust 68 can be located adjacent a pylon trailing edge 70. The fan 66 can be utilized under operating conditions when the cooling air 34 outside the pylon 54 is stagnant, such as during engine shut down cycle and for a period of time after shutdown (i.e., soakback conditions).

Additionally, in some embodiments the fan 66 can be configured to operate responsive to a determination that the engine is running (e.g., heat is being generated in the tail cone) and that the associated vehicle 21 has a speed below a threshold speed (e.g., 10 knots, 20 knots, etc.). The threshold speed can be determined based on a speed required to flow air through the inlet 38 to the exhaust 68. In some embodiments, the determination may include a determination that the vehicle 21 is stationary. In such embodiments, the fan 66 may be configured to operate when the vehicle 21 is stationary and the engine is producing heat (e.g., running and/or in a shut down cycle).

A technical advantage of the disclosed tail cone ventilation system can include a concept of ventilation for the tail cone using gas turbine fan discharge air.

Another technical advantage of the disclosed tail cone ventilation system can include providing a supply of cooling air to maintain the electronic components within predetermined temperature limits.

Another technical advantage of the disclosed tail cone ventilation system can include providing positive ventilation rates through the tail cone interior.

Another technical advantage of the disclosed tail cone ventilation system includes a tail cone cooling air flow path maintained for all flight conditions as well as during soakback shutdown conditions.

Another technical advantage of the disclosed tail cone ventilation system includes employing an electric fan to increase cooling air flow through the conduit.

There has been provided a tail cone ventilation system. While the tail cone ventilation system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for cooling a tail cone interior comprising:
   attaching a tail cone case to a gas turbine engine aft portion, the tail cone case defining the tail cone interior and a tail cone exterior, the tail cone case having a forward portion and an aft portion separated axially along a tail cone axis;
   fluidly coupling an air inlet with the tail cone interior through ducting;
   locating the air inlet externally from the tail cone interior;
   attaching a conduit to the tail cone case at the tail cone exterior and to a pylon at an opposite end, the conduit comprising a cable chase having cable the cable chase configured to receive cooling air to cool the cable;

coupling the cable in operative communication with at least one electronic component within the tail cone interior;
   and
   locating a fan within an internal flow passage; and
   extending the internal flow passage from the tail cone interior to a pylon exhaust at a pylon trailing edge.

2. The process of claim 1, wherein the air inlet comprises an air scoop configured to receive air flowing past an outer surface of at least one of the gas turbine engine or a vehicle.

3. The process of claim 1, further comprising:
   locating a tail cone discharge proximate the tail cone aft portion; and
   fluidly coupling the tail cone discharge with the air inlet.

4. The process of claim 1, further comprising:
   configuring the fan as a variable speed electric fan comprising a range of cooling air flow rates.

5. The process of claim 1, further comprising:
   configuring the fan to be operative responsive to at least one of an initiation of an engine shutdown cycle or an indication that a vehicle associated with the tail cone ventilation system is stationary.

6. The process of claim 1, further comprising:
   isolating the cable chase from the tail cone interior employing at least one of a firewall or a fire damper located within the conduit.

7. A tail cone ventilation system comprising:
   a tail cone case defining a tail cone interior and a tail cone exterior, the tail cone case having a forward portion and an aft portion separated axially along a tail cone axis;
   an air inlet fluidly coupled with the tail cone interior through ducting, the air inlet located externally from the tail cone interior;
   a conduit attached to the tail cone case at the tail cone exterior and to a pylon at an opposite end, the conduit comprising a cable chase having cable, the cable chase configured to receive cooling air to cool the cable, the cable being in operative communication with at least one electronic component within the tail cone interior; and
   a fan located within an internal flow passage extending from the tail cone interior to a pylon exhaust at a pylon trailing edge.

8. The tail cone ventilation system according to claim 7, wherein the air inlet comprises an air scoop configured to receive air flowing past an outer surface of at least one of an engine or a vehicle.

9. The tail cone ventilation system according to claim 7, wherein the cable chase is isolated from the tail cone interior by at least one of a firewall or a fire damper located within the conduit.

10. The tail cone ventilation system according to claim 7, further comprising:
   a tail cone discharge located proximate the tail cone aft portion, the tail cone discharge being fluidly coupled with the air inlet.

11. The tail cone ventilation system according to claim 7, wherein the fan comprises a variable speed electric fan configured to provide a range of cooling air flow rates.

12. The tail cone ventilation system according to claim 7, wherein the fan is operative responsive to at least one of an initiation of an engine shutdown cycle or an indication that a vehicle associated with the tail cone ventilation system is stationary.

13. A tail cone ventilation system comprising:

a gas turbine engine aft portion;

a tail cone case attached to the gas turbine aft portion; the tail cone case defining a tail cone interior and a tail cone exterior, the tail cone having a forward portion and an aft portion separated axially along a tail cone axis;

an air inlet fluidly coupled with the tail cone interior through ducting, the air inlet located externally from the tail cone interior;

a conduit attached to the tail cone case at the tail cone exterior and to a pylon at an opposite end, the conduit comprising a cable chase having cable, the cable chase configured to receive cooling air to cool the cable, the cable being in operative communication with at least one electronic component within the tail cone interior; and a fan located within an internal flow passage extending from the tail cone interior to a pylon exhaust at a pylon trailing edge.

14. The tail cone ventilation system according to claim 13, wherein the air inlet comprises an air scoop configured to receive air flowing past an outer surface of at least one of an engine or a vehicle.

15. The tail cone ventilation system according to claim 13, further comprising:

a tail cone discharge located proximate the tail cone aft portion, the tail cone discharge being fluidly coupled with the air inlet.

16. The tail cone ventilation system according to claim 13, wherein the fan comprises a variable speed electric fan configured to provide a range of cooling air flow rates.

17. The tail cone ventilation system according to claim 13, wherein the fan is operative responsive to at least one of an initiation of an engine shutdown cycle or an indication that a vehicle associated with the tail cone ventilation system is stationary.

\*  \*  \*  \*  \*